(12) United States Patent
Meyers

(10) Patent No.: US 6,993,131 B1
(45) Date of Patent: Jan. 31, 2006

(54) METHOD AND SYSTEM FOR MANAGING RIGHTS IN DIGITAL INFORMATION OVER A NETWORK

(75) Inventor: Stephan Meyers, Los Angeles, CA (US)

(73) Assignee: Nokia Corporation, Nokia Group (FI)

( * ) Notice: Subject to any disclaimer, the term of this patent is extended or adjusted under 35 U.S.C. 154(b) by 885 days.

(21) Appl. No.: 09/662,378

(22) Filed: Sep. 12, 2000

(51) Int. Cl.
*G06K 9/00* (2006.01)

(52) U.S. Cl. ............... 380/201; 380/202; 380/210; 380/212; 713/189; 713/200; 713/201; 713/165; 705/51; 705/57; 705/58; 705/59

(58) Field of Classification Search ................ 713/189, 713/200–201, 159, 165, 172, 100, 176; 705/51, 705/53–54, 57, 58, 59, 65–69, 27, 41, 405; 380/200, 201, 202, 210, 211, 212, 56
See application file for complete search history.

(56) References Cited

U.S. PATENT DOCUMENTS

| | | | |
|---|---|---|---|
| 5,133,079 A * | 7/1992 | Ballantyne et al. ......... 725/146 |
| 5,629,980 A | 5/1997 | Stefik et al. |
| 5,634,012 A | 5/1997 | Stefik et al. |
| 5,638,443 A | 6/1997 | Stefik et al. |
| 5,640,453 A * | 6/1997 | Schuchman et al. ........ 380/211 |
| 5,715,403 A | 2/1998 | Stefik ......................... 395/244 |
| 5,819,032 A | 10/1998 | De Vries et al. |
| 5,857,020 A | 1/1999 | Peterson, Jr. .................. 380/4 |
| 5,875,108 A | 2/1999 | Hoffberg et al. |
| 5,875,298 A * | 2/1999 | Harigaya et al. ........ 348/416.1 |
| 5,892,900 A | 4/1999 | Ginter et al. |
| 5,901,246 A | 5/1999 | Hoffberg et al. |
| 5,910,987 A | 6/1999 | Ginter et al. |
| 5,915,019 A | 6/1999 | Ginter et al. |
| 5,917,912 A | 6/1999 | Ginter et al. |
| 5,926,624 A * | 7/1999 | Katz et al. ................... 709/217 |
| 5,933,498 A | 8/1999 | Schneck et al. |
| 5,940,504 A | 8/1999 | Griswold |
| 5,949,876 A | 9/1999 | Ginter et al. |
| 5,982,891 A | 11/1999 | Ginter et al. |
| 6,081,750 A | 6/2000 | Hoffberg et al. |
| 6,092,080 A | 7/2000 | Gustman |

(Continued)

FOREIGN PATENT DOCUMENTS

WO   WO 00/62232   10/2000

*Primary Examiner*—Gregory Morse
*Assistant Examiner*—Tongoc Tran
(74) *Attorney, Agent, or Firm*—Cohen, Pontani, Lieberman & Pavane

(57) ABSTRACT

A method and system for distributing digital information is disclosed. Preferably, a user acquires a tangible object which contain a code authorizing access to the digital information. The user reads the tangible object through a reader, which sends the code to a server on which the digital information is stored. The server then authorizes access to the digital information to one or more access devices listed in registries belonging to the user. The user may use the digital information on the terms he agrees to, and, while in use by the user, access to the digital information to other users or other playback devices is disabled. Once the user no longer is using the digital information, the access device erases the digital information, and signals the server that the digital information is no longer in use, thereby re-enabling access to the digital information by the other playback devices listed in the registry.

20 Claims, 1 Drawing Sheet

U.S. PATENT DOCUMENTS

| | | | |
|---|---|---|---|
| 6,115,818 A * | 9/2000 | Barton | 713/176 |
| 6,170,060 B1 * | 1/2001 | Mott et al. | 713/201 |
| 6,499,106 B1 * | 12/2002 | Yaegashi et al. | 713/193 |
| 6,502,079 B1 * | 12/2002 | Ball et al. | 705/59 |
| 6,560,651 B2 * | 5/2003 | Mott et al. | 709/229 |
| 6,647,417 B1 * | 11/2003 | Hunter et al. | 709/225 |

* cited by examiner

METHOD AND SYSTEM FOR MANAGING RIGHTS IN DIGITAL INFORMATION OVER A NETWORK

BACKGROUND OF THE INVENTION

1. Field of the Invention

This invention is directed to the field of managing rights in digital information over a network, and more particularly, to a method and apparatus for managing rights in digital information over a network through the use of a physical object.

2. Description of the Related Art

The digital revolution has brought with it a proliferation of devices suitable for accessing digital information of various types, for example, DVDs, music videos, electronic books, digital files, and MP3 files. The possession of multimedia playback devices, brings with it a need for multimedia content in many different forms. Traditionally, such content is distributed in device-specific physical objects, for example, a digital versatile disk for playing in a DVD player, a compact disk for playing in a CD player, a video cassette for playing in a VCR, etc. This traditional distribution paradigm fails to take full advantage of the availability of modern distribution avenues such as the internet, and follows instead the more traditional distribution avenues which generally require a physical inventory of tangible objects containing digital information for distribution of the content. Thus, even now, in an era of burgeoning digital entertainment, retail music stores (for example) must maintain a large inventory of various kinds of physical objects in which the information is published (CDs, DVDs, video cassettes, audio cassettes, etc.). This inventory requires a great deal of cost and effort to manufacture, package, distribute, store and display. It is also duplicative, where stock of different versions of the same information must be maintained (e.g. the same movie in VHS and DVD format).

It would be advantageous if the need to maintain a physical inventory of different media was minimized, so that a user could buy a single physical object which would carry within with it access to desired information content in whatever form may be desired.

There is therefore a need to provide a more efficient way of delivering information content to the marketplace, by providing means for publishing that information utilizing modern distribution avenues, such as the internet, without the need to have that information physically embodied in a tangible medium while maintaining the ability to buy and sell physical objects. With this need, there is also a need to ensure that the distribution and access to the information is arranged securely, to minimize the unauthorized distribution and use of such information, i.e. piracy.

SUMMARY OF THE INVENTION

The present invention offers a new paradigm for distributing digital information, such as music, videos, books or other information products in a more secure and less expensive fashion, by storing the digital information in a central server and distributing it over the internet upon the payment of suitable license fees, and arranging access to the information through the use of physical objects which contain authorization to access the digital information.

Briefly stated, the invention is directed to a new method and apparatus for distributing digital information. According to the present invention, a user of the information would have access to one or more devices for accessing digital information, and register all such devices in a registry. For example, with respect to rights to play a new song with a video, the user may have a mobile personal music player, as well as a home theater system and a car stereo. Rather than purchasing different tangible media for each access device, the user may instead acquire an access card which contains an access code for downloading the song over the internet. The card could give the user rights to play a song on any or all of the possible playback devices listed in his registry, but on only one at a time (unless other licensing arrangements are made). Once the user is finished listening to the song it may be purged from the playback device, and the publisher of the digital information would be so informed, thereby enabling the further downloading of that information to one of the user's registered access devices, which may be the same access device at a later time. Once the information has been purged from its initial access device, then the other registered access devices sharing rights from the user may be enabled to receive the same information.

In this fashion, it will not be necessary to store expensive physical objects which actually contain digital information, but rather only smaller, less expensive, physical objects which contain authorization to access the information from a secure and remote location. This would minimize manufacturing, transportation, distribution and security costs.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
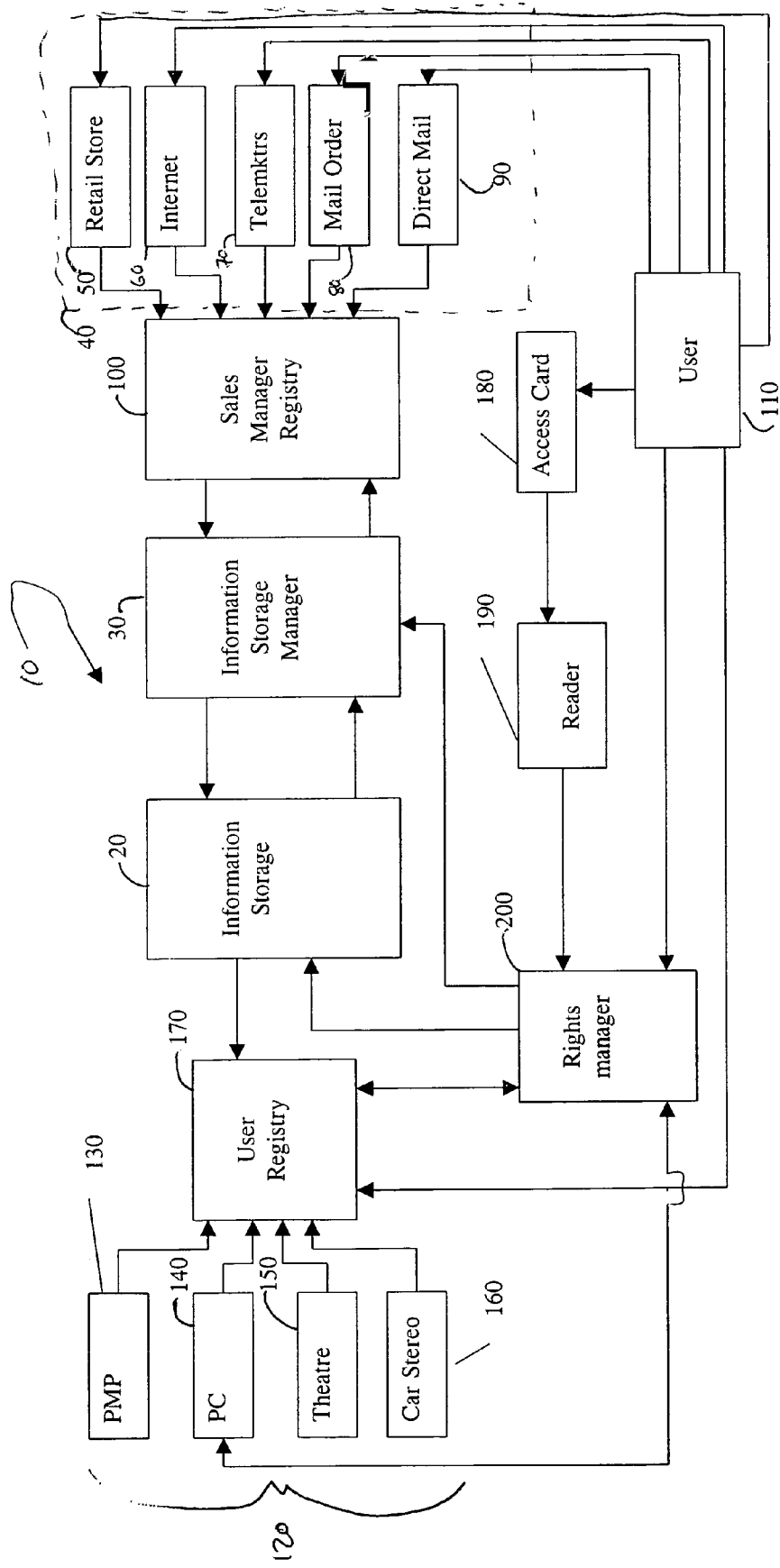
FIG. 1 shows a system for distributing digital information employing the present invention to manage rights to information content over a network, such as the internet.

According to the present invention, information which is to be made available to purchase or license, may be published not though the distribution of physical objects containing the actual information (such as CDs or videos), but rather through inexpensive physical objects which contain only the authorization needed to access the actual information, either over the internet or through any other information or communications network, such as an intranet, a LAN, mobile terminal network, Bluetooth, an extranet or other desired network.

A system for distributing, and managing rights in, the information is shown in FIG. 1, generally at 10.

As with any information content, the first step is its creation. The information, for purposes of the invention, could be any kind of content, music, music videos, books, periodicals, computer or video games, technical journals, videos, movies, information databases, or any other kind of information capable of being stored and accessed in digital form.

The publisher of the content stores the information as a digital object by downloading it into information storage memory 20, then informs information storage manager 30 of the availability of the information, and its location in information storage memory 20.

As part of this procedure, the publisher may inform information storage manager 30 of the nature of rights available for purchase or license and also the identity or nature of authorized distribution channels 40.

For example, a film producer may wish to have different packages of rights available for distributing his film. At the time of release of the film, the producer may wish to make available a soundtrack of the music and/or songs used in the film. These songs may have a video associated with the songs, either as used in the film, or separately. The film producer may also have a movie "trailer" or promotional advertisement he wishes to make available to the widest audience, without charging for the privilege. If the film is based upon a pre-existing work, such as a novel, the film producer may have arrangements to distribute the book electronically in conjunction with the release of the film.

Later, after the theatrical run of the film, the producer may make copies of the movie available for sale or rental, perhaps in a primary language and with dubbed or sub-titled versions in a secondary language. To maximize his cash flow, the producer could make available, at the time of the initial release of the film, future rights to get a copy of the film for home use.

Once the various bundles of rights were defined by the publisher of the information, he must make those various bundles available to the public. This involves contacting potential vendors 40 to distribute the information, and arranging to make the information available to the potential customers as may be desired.

By way of example, the publisher may authorize a retail store 50, an internet e-business 60, telemarketers 70, mail order firms 80, direct mail solicitors 90 or others to sell the various bundles of rights the publisher chooses to make available to the public. The various types of rights available, and the channels through which those rights may be acquired are registered in a sales manager registry 100.

At this point, the rights are available, in some fashion, to be distributed to the public.

Once available, a digital object containing the digital information, would be accessible only through the use of a secure protocol, such a public/private encryption system, or any other well known or otherwise convenient secure method. The publisher would then publish, through channels 40, access codes for access in the desired digital information.

A user 110, in order to realize the benefits of system 10, should have at least one access device 120 for accessing the digital information, for example, a mobile terminal such as a cellular phone or a portable media player (PMP) 130, a personal computer 140, a home theatre system 150 or a car stereo 160. The precise nature of the access device 120 may vary, but the user should create a registry 170 of available devices for accessing digital information. User 110 may maintain registry 40 on a SIM which is programmed in PMP 130 having the capacity to read the publisher's desired physical object containing the access code, by making registry 170 network-accessible, or otherwise.

User 110 having determined what digital information he wished to purchase and having registry 170 of his available access devices, would then seek out a desired vendor 40 to provide access to the information.

The preferred method for distributing access would be to embody access codes to the digital information in a physical object 180 such as an access card, which, in the preferred embodiment, is a credit-card-size plastic card having a magnetic stripe. Access card 180 may have on it identifying material such as a publicity photo of a recording artist if the digital information is a music video, the title of a book if the digital information being distributed in a text publication, or even be simply blank as a pure matter of design choice. There are other possible embodiments of the physical object, as well. For example the physical object could include an optical memory, a bar code, or an RF tag. The precise method of providing the access code is immaterial. The publisher could even make the information available for download over the internet thorough a secure communications channel or by distributing access codes over the telephone so that the user could be responsible for manually inputting the access codes to the desired receivers which would then access the information from information storage 20. The publisher may choose any desired method for distributing the access codes, through any distribution channel as he may deem appropriate.

A vendor would then sell, lease or lend access card 180 to user 110 and would inform sales manager registry 100 of the transaction. The transaction may be, for example, an outright sale of access card 180, similar to purchasing a CD or music video from a store. In this case, the access granted by the access code within access card 180 would be unlimited in duration, but may be limited to only one player at a time. Alternatively, the publisher may have different licensing options. For example, instead of selling a license to use the digital information on only one access device at a time, the publisher may offer the option of simultaneously using the digital information on more than one of a registered group of access devices. A publisher may sell multiple digital books which may be used by more than one person at a time, such as a school class or business grouping. The information could be downloaded or accessible over the internet or through another communications network to any number of users at a time. Games publishers could make available multi-player games by offering a single license for an appropriate number of players.

It would also be possible for the publisher to offer licenses to the digital information in varying form and in varying content. Where the digital information consisted of a music video, for example, the publisher could make the entire music video available for display upon a pocket video player or a mobile telephone. In a home system, enhanced audio capabilities for stereo or quadraphonic play, or both, could be offered, where if the access device is only capable of audio play, only audio tracks would be available (for example in the case of a car stereo). Additional content could also be made available to an access device such as a personal computer 70, whereby the user may access forms for ordering further information or purchasing tickets to a concert of the artist whose work is in the music video. Alternatively, the rights acquired may be for a limited number of uses or for a limited time, such as a video rental.

At a vendor 40, user 110 may also be offered different distribution options. For example, if user 110 has a portable media player 130 with him, he could download a music video directly into portable media player 130 at store 50. User 110 would then have the immediate gratification of watching the video as often as desired right then and there. Alternatively, the transaction may provide for off-hours distribution, perhaps at a reduced price, so that the digital information could be downloaded overnight during less busy (and less expensive) transmission periods. It would also be possible for a user 110 who did not have an access device 120 with him, to direct that vendor 40 download the digital information to a remote location. In this fashion, the user 110 may purchase a music video as a gift for a friend and have the music video downloaded immediately (or later)

to the friend's remote location for viewing. In the preferred embodiment however, the purchaser would acquire access card 180 containing the rights acquired from vendor 40 and take it with him when he left. He could then read access card 180 in a reader 190 to input the appropriate access codes and the location of the digital information into any of his access devices 120, through a rights manager 200 to access the digital information from information storage 20, and input through user registry 170 to access devices 120.

Reader 190 may be in any convenient form, as a matter of design choice. For example, it could be embodied directly in one or more of access devices 120. Alternatively, user 110 could have a single reader 190 possibly a part of rights manager 200 which would act as a central location from which access codes could be distributed.

In some circumstances, the rights could be accessed by means of access codes input directly into rights manager 200, without the use of a physical access card 180 and reader 190, when, for example, user 110 responds to a telemarketer 70 and acquires rights through a telephone transaction. Under such circumstances, user 110 may directly input access codes to rights manager 200, e.g. via keyboard, and thereby provide access rights to access devices 120.

Once the user has acquired the access codes and accessed the desired digital information, that digital information would be made unavailable to any other user. Identical information, however, with different access codes stored in either the same or a different location would still be available to other users who acquired legitimate access codes for accessing the digital information. By way of example, a publisher of a new musical recording of a popular song may maintain a virtual inventory of ten thousand copies of a currently hot recording on information storage memory 20, so that ten thousand users may access or download the information simultaneously. However, many millions of legitimate of access codes to access those ten thousands location may be distributed by use of access cards 180 containing the access codes. While any authorized user 110 could access the information so long as the maximum number of users was not exceeded, the publisher could in this fashion distribute millions of virtual copies of a recording without having the expense of manufacturing a single tangible CD. The sole cost would be the far smaller cost of manufacturing the credit card sized access cards 180, which may even be avoided entirely if the access codes are distributed solely over the internet, thereby eliminating completely the need for a physical inventory of any item whatsoever.

Each user, however, would have his own individual and unique identifying code for accessing the digital information, so that no more than one simultaneous usage of the authorized copy of the digital information could be effected at any given time, unless such rights had been acquired. Once a single user had accessed his legitimate virtual copy of the digital information, that access code would be disabled until such time as the digital information is purged from access device 120, and rights manager 200 so informs information storage manager 30 so that the access codes can be released. According to the invention, the transfer of access card 180 may transfer rights of access from one user 110 to another. Alternatively, an e-mail directing that access rights be given to a different set of receivers 120 having common rights may be sent by user 110, through rights manager 200 to information storage manager 30. This may take place where the original user has grown tired of the initial music, or simply wishes to share it temporarily with a friend. If the transfer of access rights is temporary, the procedure would have to be repeated in reverse to reinstate access rights in the initial user. The invention contemplates that the reversion of rights by virtue of a temporary transfer may also be determined at the time of the initial transfer.

User 110 may maintain an inventory of digital information on personal computer 140, or elsewhere, to choose information to access by using a personal computer 140 to contact rights manager 200, and thereby secure access rights thereto for use by any access device 120.

In this fashion, the publisher is able to maximize the value of the rights he wishes to make available to the public, and the rights are made secure since the accessibility of the information is governed by managers which can control access on the terms provided by the publisher, preferably as governed by the possession of access card 180.

The system and method in accordance with this invention would provide for the simple and efficient distribution of digital information in any different media, and under any distribution scheme that the publisher finds useful.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of distributing digital information, comprising:
    registering a digital object containing said digital information;
    registering an access device for receiving said digital object;
    requesting that access to said digital object be granted to said access device;
    transmitting said digital object to said access device;
    registering said digital object as being in use by said access device; and
    denying further transmission of said digital object to any other access device while said digital object is in use by said access device transferring access to said digital object from said one of said plurality of access devices to a non-registered access device, not stored as one of said registry; and disabling access to said digital object to said plurality of access devices stored in said registry while said non-registered access device has access to said digital object.

2. The method of claim 1, further comprising the step of:
    registering a plurality of access devices for receiving said digital object, said plurality of access devices having common rights of access to said digital object; and
    wherein said step of registering said digital object as being in use by said access device grants access to said digital object to all of said plurality of access devices having common access rights, but to no more than one of said plurality of access devices at a time.

3. The method of claim 2, wherein said plurality of access devices includes access devices of different types, and said digital object is transmitted to each of said types of access device in a form specific to each of said types of access device.

4. The method of claim 2, wherein said plurality of access devices includes access devices of different types, and said digital object is transmitted to each of said types of access device with a content specific to each of said types of access device.

5. The method of claim 1, further comprising the step of:
identifying said digital object with a unique identifying code, said unique identifying code being contained in a physical object.

6. The method of claim 5, wherein said physical object includes one of the group consisting of: a magnetic memory, a bar code, an optical memory and an RF tag.

7. The method of claim 1, wherein said step of transmitting said digital object to said access device includes transmitting said digital object over a computer network.

8. The method of claim 7, wherein said computer network includes the internet.

9. The method of claim 5, wherein said access device is capable of reading said physical object to access said unique identifying code and said step of requesting that access to said digital object be granted to said access device further comprises the step of reading said physical object.

10. The method of claim 1, further comprising the steps of:
establishing an encryption protocol for transmitting said digital information to said registry of access devices;
encrypting said digital information in accordance with said encryption protocol;
transmitting said digital information to said at least one of said access devices having common access rights to said digital information in encrypted form;
decrypting said digital information on receipt thereof by said at least one of said access devices having common access rights to said digital information.

11. A system of distributing digital information, comprising:
a first registry for registering a digital object containing said digital information;
an access device for receiving said digital object;
means for requesting that access to said digital object be granted to said access device;
a first transmitter for transmitting said digital object to said access device;
a controller for registering said digital object as being in use by said access device; and
a manager for denying further transmission of said digital object to any other access device while said digital object is in use by said access device.

12. The system of claim 11, further comprising:
a plurality of access devices for receiving said digital object, said plurality of access devices having common rights of access to said digital object; and
a second registry for registering said plurality of access devices;
wherein said controller includes means to grant access to said digital object to all of said plurality of access devices having common access rights, but to no more than one of said plurality of access devices at a time.

13. The system of claim 11, further comprising:
means for identifying said digital object with a unique identifying code, said means for identifying including a physical object.

14. The system of claim 13, wherein said physical object includes one of the group consisting of a magnetic memory, a bar code, an optical memory and an RF tag.

15. The system of claim 13, further comprising a reader for reading said physical object.

16. The system of claim 12, further comprising:
means for transferring said access to said digital object from said one of said plurality of access devices to a non-registered access device, not stored as one of said registry; and
means for disabling access to said digital object to said plurality of access devices stored in said second registry while said non-registered access device has access to said digital object.

17. The system of claim 11, further comprising:
means for registering a unique identifying code containing a location of said digital object, said means for registering including a physical object;
a memory for storing a second registry of access devices for accessing said digital object, each of said access devices having common access rights to said digital object, at least one of said of access devices including a reader for reading said unique identifying code; and
a second transmitter for transmitting said unique identifying code to a server on which said digital object is stored, and also for transmitting said second registry of access devices to said server;
said manager including means for comparing said unique identifying code with a list of authorized codes of digital information;
said first transmitter including means for transmitting said digital object to at least one of said access devices having common access rights to said digital object, when said unique identifying code corresponds to an authorized code;
said manager further including means for denying access to said digital object to said access devices when said unique identifying code fails to correspond to an authorized digital object;
said controller including means for disabling further transmission of said digital object to any other access devices after transmission of said digital object to said at least one of said access devices; and
said controller further including means for re-enabling the transmission of said digital object to said at least one of said access devices after receipt of a signal indicating that said digital object is no longer being stored in said at least one of said access devices to which it had been transmitted.

18. The system of claim 11, further comprising means for setting a time for transmitting said digital object to said access device.

19. The system of claim 16, further comprising means for selecting which of said access devices stored in said registry will receive said digital information.

20. The method of claim 16, further comprising:
means for encrypting said digital information before transmission thereof to said registry of access devices;
means for transmitting said digital information to said at least one of said access devices having common access rights to said digital information in encrypted form; and
means for decrypting said digital information on receipt thereof by said at least one of said access devices having common access rights thereto.

* * * * *